May 30, 1967     C. G. NEALE ETAL     3,322,463
ARMREST FOR AUTOMOTIVE SEATS
Filed March 3, 1966
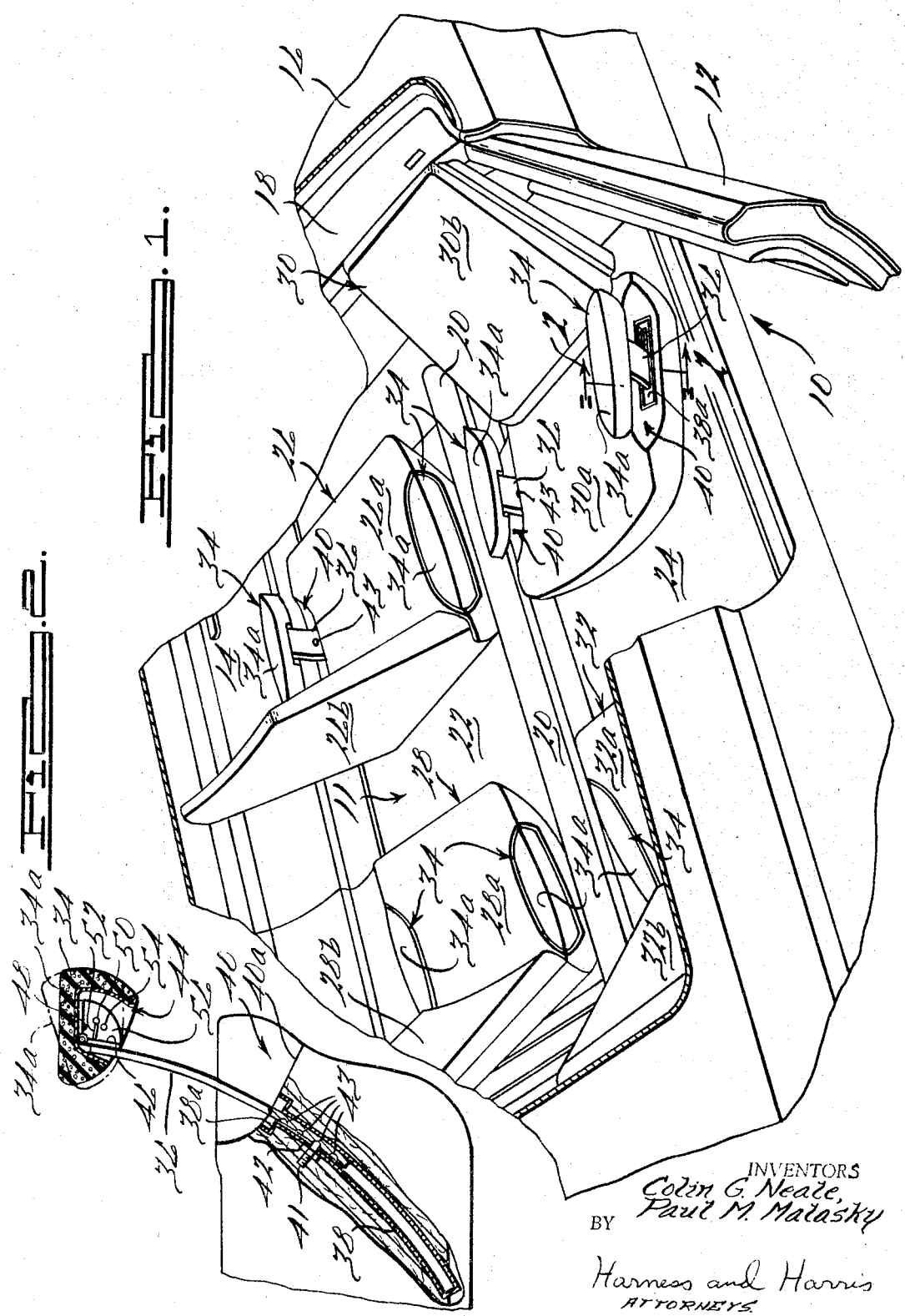
INVENTORS
Colin G. Neale,
Paul M. Malasky
BY
Harness and Harris
ATTORNEYS

United States Patent Office 3,322,463
Patented May 30, 1967

3,322,463
ARMREST FOR AUTOMOTIVE SEATS
Colin G. Neale, Dearborn, and Paul M. Malasky, Grosse Ile, Mich., assignors to Chrysler Corporation, Highland Park, Mich., a corporation of Delaware
Filed Mar. 3, 1966, Ser. No. 531,472
9 Claims. (Cl. 297—417)

This invention relates to armrests for automotive seats.

It is an object of the present invention to provide an improved armrest for use with an automotive seat.

Another object is to provide an armrest especially suitable for use with automotive seats of the bucket type.

Another object is to provide an automotive armrest which is selectively adjustable in height.

The invention provides an armrest member for use with an automotive seat assembly of the type including a seat bottom and a seat back. According to an important feature of the invention, the armrest member is mounted for generally translatory movement between a stowed position, in which an arm support surface defined by the armrest member lies adjacent and generally parallel to the upper surface of the seat bottom, and a working position in which the arm support surface remains generally parallel to the seat bottom but is spaced thereabove to comfortably support the forearm of an occupant of the seat assembly.

According to a further feature of the invention, in the stowed position of the armrest member the aforesaid arm support surface is generally flush with the upper surface of the seat bottom so that it forms an extension of the seat surface.

According to yet another feature of the invention, an upper side edge of the seat bottom is cut away to provide a pocket or recess into which the armrest member is lowered to achieve the stowed position of the latter.

These and other objects, features and advantages of the invention will be apparent from the following detailed description of a preferred embodiment of the invention and from the accompanying drawings wherein:

FIG. 1 is a fragmentary perspective view of a motor vehicle embodying seat assembly and armrest structures according to the invention; and FIG. 2 is a detail view taken on line 2—2 of FIG. 1.

The motor vehicle seen fragmentarily in FIG. 1 includes a body structure 10 defining a passenger compartment 11. Body structure 10 includes doors 12, 14, cowl 16, instrument panel 18, drive shaft tunnel 20 and left and right floor portions 22, 24.

Four individual seat assemblies of the bucket type are positioned within passenger compartment 11.

Driver's seat assembly 26 and left rear seat assembly 28 are positioned one behind the other on left floor portion 22. Driver's seat assembly 26 includes a seat bottom 26a and a seat back 26b. Left rear passenger seat assembly 28 includes a seat bottom 28a and a seat back 28b.

Front passenger seat assembly 30 and right rear passenger seat assembly 32 are positioned one behind the other on right floor portion 24. Front passenger seat assembly 30 is mounted for swiveling movement between a generally forwardly facing position and the illustrated generally rearwardly facing position and includes a seat bottom 30a and a seat back 30b. Right rear passenger seat 32 includes a seat bottom 32a and a seat back 32b.

An armrest member 34 is provided at each side of each seat bottom. Each armrest member 34 is elongated and defines at its upper surface an elongated arm support surface 34a. Each member 34 is mounted for generally translatory movement between a stowed position in which arm support surface 34a lies adjacent and generally parallel to the upper surface of the related seat bottom and a working position in which arm support surface 34a remains generally parallel to the seat surface but is spaced thereabove to comfortably support the forearm of an occupant of the related seat assembly.

The working position of the armrest member is illustrated by both armrest members of front passenger seat assembly 30 and by the left armrest member of driver's seat assembly 26. The remaining armrest members are shown in their stowed positions.

The mounting means for each armrest member comprises a post 36 in the form of an elongated plate secured at its upper end to the related armrest member and telescopically received in the related seat bottom to allow the armrest member to be reciprocated between its aforesaid stowed and working positions.

As best seen in FIG. 2, plate or post 36 is arcuate and is received in an arcuate sheath 38 embedded in the related seat bottom. The adjacent upper side edge of the seat bottom is selectively cut away to provide a pocket or recess 40 into which the upper end of sheath 38 opens. The upper end of sheath 38 is widened to provide a mouth portion 38a which is flush mounted in the bottom wall 40a of pocket 40. Pocket 42 is shaped to generally conform to the shape of the underside of armrest member 34 so that as post 36 is telescoped downwardly into sheath 38 armrest member 34 is lowered into pocket 40 to achieve its stowed position. In this position, arm support surface 34a is generally flush with the upper surface of the related seat bottom to form a lateral extension of that surface.

A pin 41 threads into a nut 42 welded to sheath 38 and protrudes into the interior of the sheath for selective coaction with a series of dimples 43 formed in post 36. Pin 41 and dimples 43 allow armrest member 34 to be releasably positioned in each of a plurality of vertically spaced positions.

Sheath 38 slopes inwardly toward the central of the related seat bottom. As a result, the armrest member moves laterally outwardly of the seat bottom as it is raised to its working position. This laterally outward movement of the armrest member allows it to readily clear the leg of an occupant seated on the related seat bottom and disposes arm support surface 34a in a position to comfortably accommodate the forearm of the occupant.

Although the movement of the armrest member between its stowed and working positions is generally translatory, the armrest member does undergo a slight degree of rotation during this movement due to the arcuate configuration of the sheath and post.

To allow for compensation of this rotation, the armrest member is pivotally mounted on the upper end of the post.

This pivotal mounting comprises a downwardly opening pocket or recess 44 formed in the armrest member and a hinge having one leaf or strap 46 secured to the upper end of post 36 and its other strap 48 secured to the upper wall of pocket 42. A pin 50 carried on a rod 52 rigid with strap 46 selectively coacts with a pair of arcuately spaced dimples 54 formed in a plate 56 rigid with strap 48. As armrest member 34 is moved upwardly from its stowed position to its working position, arm support surface 34a is rotated into a slightly canted position with respect to the upper surface of the seat bottom. This canted position is seen in phantom in FIG. 2. To return surface 34a to a position parallel to the upper surface of the seat bottom, armrest member 34 is rotated about the axis of hinge 46, 48 to its solid line position, this position being determined by the detenting of pin 50 into lower dimple 54. When the armrest member is again lowered to its stowed position, the leading lower edge 34b of the armrest member engages pocket wall 40a to rotate the armrest member about its hinge axis in compensation for the slight angular movement it has undergone while being lowered. Arm support surface is thus moved automatically into a position generally flush with and parallel to the upper surface of the related seat bottom, this position being defined by the detenting of pin 50 into upper dimple 54.

Although a preferred embodiment of the invention has been illustrated and described in detail, it will be understood that various changes may be made in the disclosed embodiment without departing from the scope or spirit of the invention as defined in the appended claims.

We claim:

1. In a motor vehicle seat assembly of the type including a seat bottom having a front, a back, and spaced sides, and a seat back extending upwardly from said seat bottom adjacent the back thereof;
    (A) an armrest member defining an elongated, generally horizontal arm support surface; and
    (B) means mounting said armrest member for generally translatory movement between
        (1) a stowed position in which said elongated arm support surface extends along one side of said seat bottom in a position adjacent and generally parallel to the upper surface of said seat bottom and
        (2) a working position in which said elongated arm support surface remains extended along said one side of said seat bottom in a position generally parallel to said seat bottom upper surface but is spaced thereabove to comfortably support the forearm of an occupant of said seat assembly.

2. A motor vehicle seat assembly according to claim 1 wherein
    (A) said seat assembly is of the bucket type; and
    (B) an armrest member and associated mounting means, both as aforedescribed, are provided at each side of said seat bottom.

3. A motor vehicle seat assembly according to claim 1 wherein, in the stowed position of said armrest, said arm support surface is generally flush with said seat bottom upper surface.

4. A motor vehicle seat assembly according to claim 1 wherein
    (A) an upper side edge of said seat bottom is cut away to provide a recess and
    (B) said mounting means are arranged to lower said armrest member into said recess to achieve the aforesaid stowed position.

5. A motor vehicle seat assembly according to claim 4 wherein
    (A) said seat assembly is of the bucket type; and
    (B) an armrest member, associated mounting means, and recess, all as aforedescribed, are provided at each side of said seat bottom.

6. A motor vehicle seat assembly according to claim 1 wherein said arm support surface in the working position of said armrest member is spaced laterally from its position in the stowed position of said member.

7. A motor vehicle seat assembly according to claim 1 wherein said mounting means comprises
    (A) a post secured at its upper end to said armrest member and
    (B) means on said seat bottom telescopically receiving said post to allow the latter to be reciprocated to move said armrest member between its aforesaid positions.

8. A motor vehicle seat assembly according to claim 7 wherein
    (A) said post is arcuate; and
    (B) said receiving means on said seat bottom comprises an arcuate sheath, whereby as said post is moved telescopically in said sheath, said armrest member is moved along a circle centered on the arcuate center of said post and sheath.

9. A motor vehicle seat assembly according to claim 8 wherein said armrest member is pivotally secured to the upper end of said post for rotation about an axis generally parallel to the central axis of said seat assembly, whereby following movement of said armrest from one to the other of its positions it may be pivoted about its aforesaid axis by an amount to compensate for the slight rotation it has undergone during such movement.

References Cited

UNITED STATES PATENTS

| | | | |
|---|---|---|---|
| 3,027,194 | 3/1962 | Rumptz | 297—410 |
| 3,063,751 | 11/1962 | Hatch | 297—410 |
| 3,159,427 | 12/1964 | Lawson | 297—410 |
| 3,168,346 | 2/1965 | Rei | 297—417 X |
| 3,173,722 | 3/1965 | Carbonetti | 297—427 X |

FOREIGN PATENTS 567,299  5/1958  Belgium.

CASMIR A. NUNBERG, *Primary Examiner.*